United States Patent
Giere et al.

(10) Patent No.: US 12,038,503 B2
(45) Date of Patent: Jul. 16, 2024

(54) RADAR SYSTEM THAT USES VELOCITY LABELED MULTIPLEXING FOR GENERATING DETECTIONS

(71) Applicant: GM Cruise Holdings LLC, San Francisco, CA (US)

(72) Inventors: Andre Giere, Oberpframmern (DE); Özlem Karaca, Munich (DE); Johanna Gütlein-Holzer, Munich (DE); Richard Johann Körber, Hallerndorf (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 256 days.

(21) Appl. No.: 17/394,383

(22) Filed: Aug. 4, 2021

(65) Prior Publication Data
US 2023/0048316 A1  Feb. 16, 2023

(30) Foreign Application Priority Data
Aug. 3, 2021  (EP) ..................... 21189485

(51) Int. Cl.
*G01S 13/931* (2020.01)
*G01S 7/02* (2006.01)
(Continued)

(52) U.S. Cl.
CPC ............ *G01S 13/931* (2013.01); *G01S 7/354* (2013.01); *G01S 13/343* (2013.01);
(Continued)

(58) Field of Classification Search
CPC .... G01S 13/931; G01S 13/582; G01S 13/584; G01S 13/343; G01S 13/345; G01S 7/354;
(Continued)

(56) References Cited

U.S. PATENT DOCUMENTS

| | | |
|---|---|---|
| 5,422,646 A | 6/1995 | Lewis |
| 7,031,265 B2 | 4/2006 | Owen et al. |

(Continued)

FOREIGN PATENT DOCUMENTS

| | | |
|---|---|---|
| CN | 115902858 A | 4/2023 |
| EP | 3315994 A1 | 5/2018 |
| EP | 3611538 A1 | 2/2020 |

OTHER PUBLICATIONS

"Office Action for U.S. Appl. No. 17/407,110", Mailed Date: Aug. 25, 2023, 13 pages.
(Continued)

*Primary Examiner* — Vladimir Magloire
*Assistant Examiner* — Michael W Justice
(74) *Attorney, Agent, or Firm* — CALFEE, HALTER & GRISWOLD LLP

(57) ABSTRACT

A fast ramp frequency modulated continuous wave (FMCW) radar system is described herein, where the fast ramp FMCW radar system is configured to employ velocity labeled multiplexing (VLM) in connection with generating detections for objects in a scene. Transmitters in the radar system are assigned different velocity labels that corresponds to different phase rates of change of consecutive chirps in signals emitted by the transmitters. Approaches for generating detections based upon echo signals that correspond to the emitted signals are also described herein.

20 Claims, 10 Drawing Sheets

(51) Int. Cl.
*G01S 7/35* (2006.01)
*G01S 13/34* (2006.01)
*G01S 13/58* (2006.01)

(52) U.S. Cl.
CPC ........... *G01S 13/584* (2013.01); *G01S 7/0233* (2021.05); *G01S 7/356* (2021.05)

(58) Field of Classification Search
CPC ........ G01S 7/356; G01S 7/023; G01S 7/0232; G01S 7/0233; G01S 2013/0245
USPC .......................................................... 342/70
See application file for complete search history.

(56) References Cited

U.S. PATENT DOCUMENTS

| | | | |
|---|---|---|---|
| 9,541,638 B2 | 1/2017 | Jansen et al. | |
| 9,720,073 B1 | 8/2017 | Davis et al. | |
| 10,141,657 B2 | 11/2018 | Kishigami et al. | |
| 10,386,462 B1* | 8/2019 | Hong | G01S 13/46 |
| 10,585,182 B2 | 3/2020 | Bilik et al. | |
| 10,620,305 B2 | 4/2020 | Cornic et al. | |
| 10,630,249 B2 | 4/2020 | Rao et al. | |
| 10,921,436 B2 | 2/2021 | Jansen | |
| 11,073,607 B2 | 7/2021 | Koubiadis et al. | |
| 11,299,147 B2* | 4/2022 | Kang | B60W 30/09 |
| 11,402,483 B2* | 8/2022 | Long | G01S 13/89 |
| 11,428,802 B2 | 8/2022 | Barngrover et al. | |
| 11,428,805 B2 | 8/2022 | Kishigami et al. | |
| 11,614,531 B2* | 3/2023 | Wu | G01S 7/42 342/149 |
| 11,614,538 B2* | 3/2023 | Davis | G01S 13/87 342/16 |
| 11,662,427 B2* | 5/2023 | Wu | G01S 13/343 342/194 |
| 11,762,088 B2 | 9/2023 | Kishigami et al. | |
| 2005/0063386 A1 | 3/2005 | Owen et al. | |
| 2016/0285172 A1 | 9/2016 | Kishigami et al. | |
| 2018/0120427 A1 | 5/2018 | Cornic et al. | |
| 2018/0252809 A1* | 9/2018 | Davis | G01S 13/931 |
| 2018/0275264 A1 | 9/2018 | Bilik et al. | |
| 2019/0044485 A1 | 2/2019 | Rao et al. | |
| 2020/0049812 A1* | 2/2020 | Jansen | G01S 13/4454 |
| 2020/0166625 A1 | 5/2020 | Koubiadia et al. | |
| 2020/0217945 A1* | 7/2020 | Long | G01S 13/26 |
| 2020/0238982 A1* | 7/2020 | Kang | B60W 10/18 |
| 2020/0393553 A1 | 12/2020 | Kishigami et al. | |
| 2021/0173042 A1* | 6/2021 | Wu | G01S 13/584 |
| 2021/0173069 A1* | 6/2021 | Wu | G01S 13/931 |
| 2021/0190904 A1 | 6/2021 | Bourdoux et al. | |
| 2021/0333386 A1 | 10/2021 | Park et al. | |
| 2022/0171048 A1 | 6/2022 | Kishigami | |
| 2022/0171049 A1* | 6/2022 | Wu | H04B 7/0413 |
| 2022/0209396 A1* | 6/2022 | Lee | G01S 13/42 |
| 2022/0283286 A1 | 9/2022 | Wu et al. | |
| 2022/0350020 A1* | 11/2022 | Davis | G01S 13/931 |
| 2022/0381903 A1 | 12/2022 | Kishigami et al. | |
| 2023/0043829 A1 | 2/2023 | Giere et al. | |
| 2023/0047968 A1 | 2/2023 | Giere et al. | |
| 2023/0243964 A1* | 8/2023 | Davis | G01S 7/0233 342/16 |
| 2023/0393268 A1 | 12/2023 | Kishigami et al. | |

OTHER PUBLICATIONS

"Notice of Allowance and Fees Due for U.S. Appl. No. 17/407,110", Mailed Date: Feb. 15, 2024, 5 pages.

"Response to the Office Action for U.S. Appl. No. 17/407,110", filed Jan. 19, 2024, 9 pages.

"Response to the Communication Pursuant to Rule 69 EPC for European Patent Application No. 21209387.6", Filed Date: Nov. 24, 2023, 15 pages.

"Extended European Search Report for European Patent Application No. 21189485.2", Mailed Date: Jan. 27, 2022, 7 pages.

"Extended European Search Report for European Patent Application No. 21209387.6", Mailed Date: May 2, 2022, 11 pages.

Sun, et al., "Analysis and Comparison of MIMO Radar Waveforms", in 2014 International Radar Conference, Oct. 13, 2014, pp. 1-6.

"Office Action for United States U.S. Appl. No. 17/535,562", Mailed Date: Feb. 28, 2024, 12 pages.

* cited by examiner

RADAR SYSTEM THAT USES VELOCITY LABELED MULTIPLEXING FOR GENERATING DETECTIONS

RELATED APPLICATION

This application claims priority to European Patent Application No. EP21189485.2, filed on Aug. 3, 2021, and entitled "RADAR SYSTEM THAT USES VELOCITY LABELED MULTIPLEXING FOR GENERATING DETECTIONS". The entirety of this application is incorporated herein by reference.

BACKGROUND

An autonomous vehicle is a motorized vehicle that can operate without human conduction. An exemplary autonomous vehicle includes a plurality of sensor systems, such as but not limited to, a lidar sensor system, a camera sensor system, and a radar sensor system, amongst others. The autonomous vehicle operates based upon sensor signals output by the sensor systems. For example, a radar sensor system can identify a range from the autonomous vehicle to another vehicle in a driving environment, and the autonomous vehicle can plan and execute a maneuver to traverse the driving environment based upon the identified range to the other vehicle.

Multiple-input multiple-output (MIMO) radar sensor systems can be utilized in autonomous vehicles to improve spatial resolution, while maintaining low hardware cost and complexity. Conventional MIMO radar sensor systems implement various types of multiplexing schemes, where mutually orthogonal modulated signal sequences are transmitted on a transmit side and de-multiplexed on a receiver side. Moreover, subsequent signal processing (mainly in the digital domain) can be employed to extract virtual channels with respect to their transmitter correspondence. Examples of multiplexing schemes that are conventionally utilized to provide orthogonal transmit signals include Time Division Multiplexing (TDM), Frequency Division Multiplexing (FDM), and Code Division Multiplexing (CDM).

In TDM, orthogonality among the transmitted signals is obtained in the time domain by dividing a transmit period into time slots, where only a single transmitter from the multiple transmitters of the MIMO radar sensor system irradiates per time slot. However, a MIMO radar sensor system that implements TDM can expose motion-induced phase error in the virtual channels due the time elapsed between consecutively acting transmitters. Relative to other approaches, TDM schemes may also lead to increased measurement time and velocity ambiguity, with both increasing based on the number of participating transmitters.

In FDM, orthogonality among transmitted signals is obtained in the frequency domain by dedicating an exclusive and non-overlapping frequency band for each transmitter of the MIMO radar sensor system. However, greater receiver bandwidth is typically needed to support FDM relative to other types of multiplexing schemes. Moreover, hardware complexity can be increased for modulation, multiplexing, demodulation, and demultiplexing in a MIMO radar sensor system that employs FDM as compared to other types of multiplexing.

In CDM, orthogonality among the transmitted signals is obtained by modulation of a mutually orthogonal spread code for each transmitter in slow-time or fast-time sequences. To obtain the virtual channel elements corresponding to a transmitter, demultiplexing can occur by cross-correlation of the per channel sequence with the respective spread code. CDM can be computationally intensive, since spreading occurs prior to range (fast-time spread code) or velocity processing (slow-time spread code), respectively, resulting in more channels in subsequent processing steps. Moreover, the resulting velocity spectrum can be prone to high sidelobe levels (which may be addressed by increasing the sequence length in fast-time or slow-time, respectively).

SUMMARY

The following is a brief summary of subject matter that is described in greater detail herein. This summary is not intended to be limiting as to the scope of the claims.

A (fast-ramp) frequency modulated continuous wave (FMCW) multiple input multiple output (MIMO) radar system is described herein. The radar system is configured to compute range, velocity, and direction of arrival angle of objects relative to the radar system. The radar system includes several transmitting antennas and several receiving antennas, where the transmitting antennas simultaneously transmit radar signals, and further where each transmitted radar signal includes a sequence of consecutive frequency ramps (chirps) having linearly increasing frequency in time. Per transmitting antenna, the consecutive frequency ramps are modulated with an incremental phase offset. Hence, the phase of each consecutive chirp is incremented with a unique phase rate of change—that is, each transmitting antenna has a fixed correspondence to a phase offset value. Effectively, then, each transmitting antenna is labeled with a velocity offset that corresponds to the phase rate of change assigned to the transmitting antenna. This approach is referred to herein as velocity-labeled multiplexing (VLM).

Receiver channels of the radar system receive echo signals caused by the transmitted signals reflecting from objects, whereupon the echo signals are processed to provide frequency spectra. With respect to a received echo signal and a single receiver channel, energy of the echo signal is distributed and ordered into distinguishable positions in the velocity spectrum (e.g., velocity bins) in correspondence to the unique phase offset modulation of the ramps in the transmitted radar signal that corresponds to the echo signal. Furthermore, the energy distribution in the velocity spectrum is determined by the actual velocity of a detected object in terms of a velocity offset. This shifts the positions of the energy peaks in the velocity spectrum by a number of velocity bins relative to the actual velocity. However, the order of the positions and the distance among the positions is maintained irrespective of the object's actual velocity.

For the case that there is prior knowledge of the actual velocity of the object, the transmitting antenna to velocity positions correspondence can directly be inferred in the velocity spectrum from the distance, i.e., phase offsets, among the positions. Thus, a virtual receiver array can be formed by collecting the receive channels corresponding to the transmitters as identified in the velocity spectrum. Beamforming applied on this virtual array provides the beam spectrum for the respective velocity bin.

Generally, however, prior knowledge about the actual velocity of the object is unavailable in a signal processing system. Consequently, a position in the velocity spectrum to begin with collecting respective receive channels for virtual array formation is unknown. Therefore, the subsequent processing steps can be described as follows: 1) virtual array formation is begun with receivers respective to a first velocity bin and consecutive velocity bins due to the known velocity offset labeling scheme; 2) virtual array formation is continued consecutively for all velocity bins in a circular manner throughout a velocity spectrum of the radar system; 3) beamforming is undertaken with each virtual array; 4) after beamforming, the velocity spectrum will peak with a mainlobe at the position of the actual velocity of the object and expose sidelobes at some other positions; and 5) this information can be detected and used to measure the actual velocity of the object.

Reduction in processing performed to compute velocities is possible by including the following processing steps, as will be described in greater detail herein: 1) incoherent integration is performed over receive channels to form a heat map; 2) target detection and target velocity identification is performed under consideration of the velocity labeling scheme and range dependent subarray formation; 3) beamforming with a complete virtual array at range-velocity bins identified in step 2); and 4) detection with enhanced signal to noise ratio is performed due to coherent integration of all virtual channels in the beamforming step. Again, this procedure reduces the amount of data that is processed.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
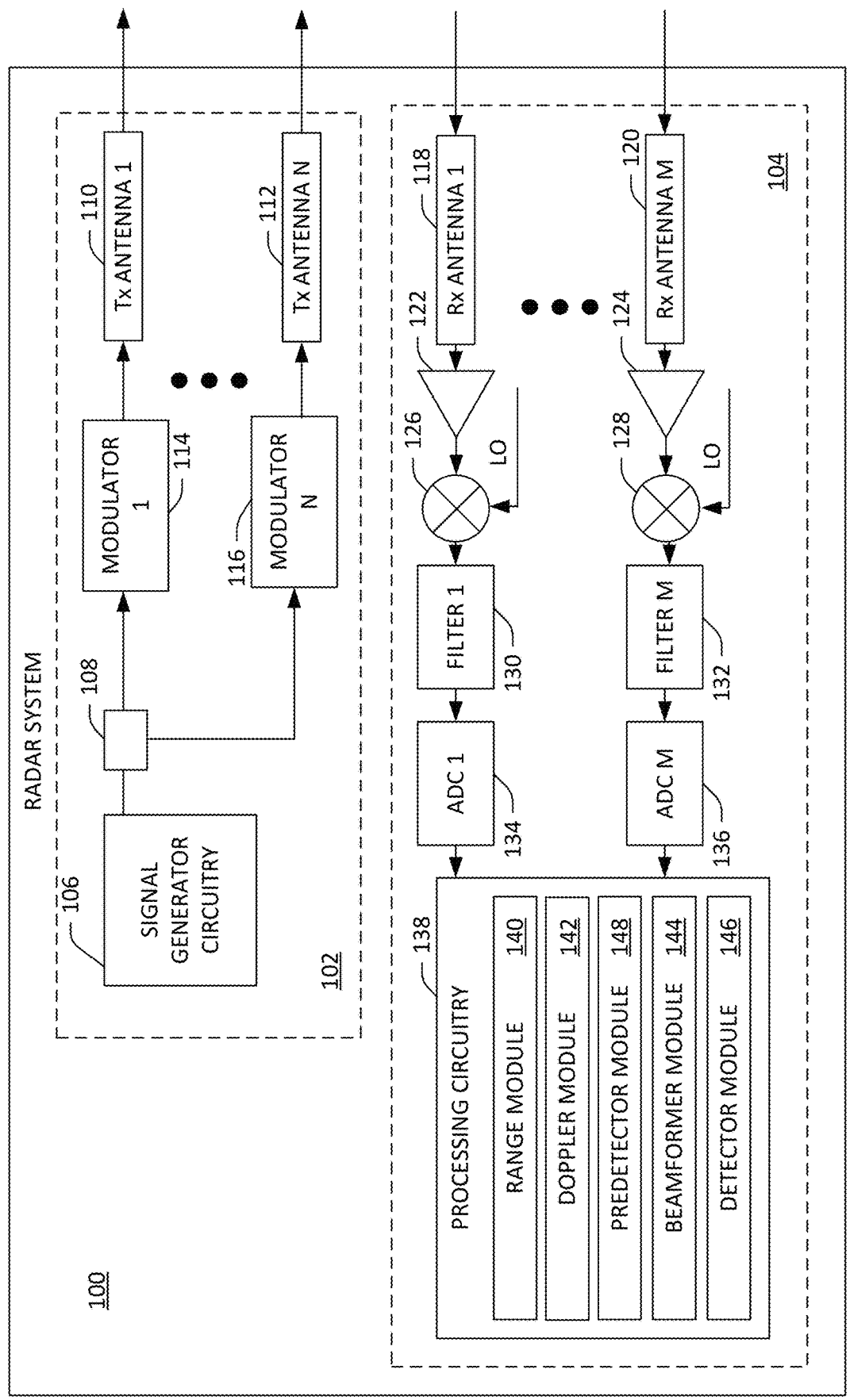
FIG. 1 is a functional block diagram of a frequency modulated continuous wave (FMCW multiple input multiple output (MIMO) radar system.

Various technologies pertaining to automotive radar sensor systems with two-dimensional beamforming, using multiple receivers and multiple simultaneously operating transmitters are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

The present invention generally relates to a radar system and a method of operating thereof, and more particularly to a radar system including an efficient use of signal processing resources due to data reduction by way of a two-step process for generating a target detection, such that range to the target, relative velocity of the target, and relative direction of the target can be computed.

A frequency modulated continuous wave (FMCW) radar system and method is described herein, where the radar system includes multiple receivers (M) and multiple simultaneously operating transmitters (N), thereby providing a two-dimensional virtual array with relatively high angular resolution in horizontal and vertical direction. To avoid extensive cycle time and velocity ambiguity, the transmitters are operated simultaneously and not sequentially (e.g., the transmitters transmit FMCW signals simultaneously). The transmitters are modulated in frequency within fast chirps to create a high range-resolution profile. Multiple chirps are transmitted to achieve relatively high velocity resolution. To separate the signals from the individual transmitters within the receiver channel, the phase of at least some of the transmit signals is modulated from chirp to chirp. Each signal has an individual starting phase and phase-increment from chirp to chirp. A Fast Fourier Transform (FFT) is applied within the chirp (fast time) and from chirp to chirp (slow time) to achieve a range-velocity echo profile for each receiver-channel. The phase increment can be selected in a way that the signals from individual transmitters are distributed over the velocity-dimension (Doppler division multiplex) with velocity offsets in accordance with the phase increments. The effect of this transmitter phase modulation is that a single target exhibits N spectral repetitions in the velocity spectrum, each assigned to one of N transmitters. Thus, the true velocity bin of the target is ambiguous, unless the assignment of the velocity bins to each transmitter is known. For the purpose of beamforming, the velocity bins assigned to each transmitter are extracted, resulting in M×N virtual receiving channels. A virtual array is then formed on which beamforming is processed. Finally, detection and filtering take place.

To achieve a significant data reduction within the signal processing chain before beamforming, and thereby reduce an amount of processing resources required to perform velocity computation, in an example, a two-step detection procedure can be undertaken. Initially, in each range-velocity bin, non-coherent integration across channels is applied, resulting in a heat map representation of the data. A first detector processes this heat map to find potential detections in the range-velocity grid. To resolve the velocity ambiguity of each potential detection, a routine is executed to extract the velocity bin assignment to each transmitter. The first detector output identifies the range-velocity bin of the target. In the next step, beamforming is processed in the detected range-velocity bins. Due to the correct assignment of the velocity bins to the transmitters, it is possible to use the complete M×N virtual array for the beamforming. Therefore, the processing gain is increased. The second detector processes and filters the range-velocity-beam data cube, resulting in the final detections as output of the signal processing chain. These aspects are described in greater detail herein.

With reference now to FIG. 1, a functional block diagram of a radar system 100 is presented. The radar system 100 includes transmitting electronics 102 and receiving electronics 104. The transmitting electronics 102 include signal generator circuitry 106 that is configured to generate and output an FMCW radar signal, where the FMCW radar signal includes a sequence of frequency ramps, with each ramp having an up-chirp with linearly increasing frequency. The signal generator circuitry 106 includes suitable circuitry for generating and outputting the FMCW signal, including amplifiers, filters, etc.

The transmitting electronics 102 further include a power divider 108 that receives the FMCW radar signal output by the signal generator circuitry 106 and outputs N copies of the FMCW radar signal. The transmitting electronics 102 also include N transmitting antennas 110-112 that output FMCW radar signals based upon the respective N FMCW radar signals output by the power divider 108. In an example, the N transmitting antennas 110-112 include between three and ten transmitting antennas. In another example, the N transmitting antennas include between four and twenty transmitting antennas. It is to be understood, however, that there may be any suitable number of transmitting antennas 110-112 in the transmitting electronics 102, where N is greater than 1. In an example, the transmitting antennas 110-112 are included in a two-dimensional array of transmitting antennas, such that the first transmitting antenna 110 is vertically offset from a second transmitting antenna in the transmitting antennas 110-112 and is horizontally offset from a third transmitting antenna in the transmitting antennas 110-112. In another example, the transmitting antennas 110-112 are included in a one-dimensional array of transmitting antennas, such that the first transmitting antenna 110 is horizontally offset from a second transmitting antenna in the transmitting antennas 110-112 but is not vertically offset from any other antenna in the transmitting antennas 110-112.

Further, the transmitting antennas 110-112 may be uniformly spaced with respect to one another, such that distances between any two adjacent antennas in the horizontal or vertical direction in the transmitting antennas 110-112 is equivalent. In another example, the transmitting antennas are non-uniformly spaced with respect to one another, such that a first distance between a first pair of transmitting antennas that are adjacent to one another is different from a second distance between a second pair of transmitting antennas that are adjacent to one another.

The transmitting electronics 102 also include N modulators 114-116 that are respectively coupled to the N transmitting antennas 110-112, although the first modulator 114, as will be described herein, is optional. The modulators 114-116 perform phase modulation on the FMCW radar signal received from the power divider 108 on a chirp-by-chirp basis, such that a phase offset at each chirp is incremented in accordance with a phase rate of change that is uniquely assigned to the appropriate one of the transmitting antennas 110-112.

The radar system 100 is configured to compute a velocity of a target relative to the radar system 100 over a velocity range; for example, between −200 km/hour and 200 km/hour, and therefore a range of 400 km/hour. Each phase rate of change corresponds to a velocity offset within the velocity range. Thus, for a phase rate of change of zero (e.g., the FMCW signal output by the power divider 108 is not subjected to phase modulation), the velocity offset is zero. In contrast, for a non-zero phase rate of change, the velocity offset is non-zero. The phase rates of change can be selected such that the velocity offsets are uniformly distributed across the velocity range (e.g., differences between velocity offsets that are adjacent to one another are all the same). In another example, the phase rates of change can be selected such that the velocity offsets are non-uniformly distributed across the velocity range; non-uniformly distributing the velocity offsets across the velocity range has advantages that are described in greater detail below. In summary, then, each transmitting antenna in the transmitting antennas 110-112 has a respective unique phase rate of change assigned thereto, such that signals emitted by the transmitting antennas 110-112 are orthogonal with respect to one another.

Figure 2:
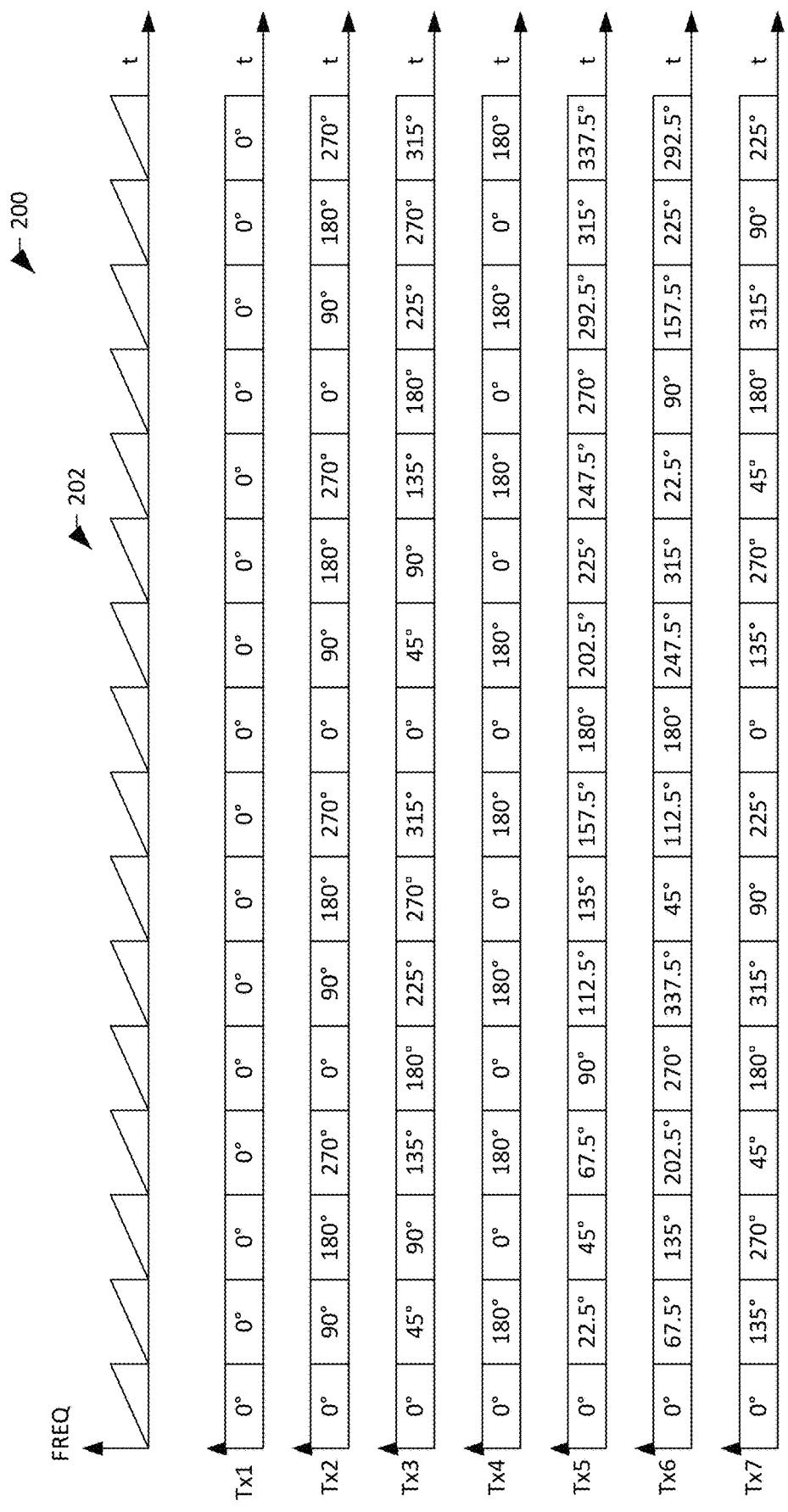
FIG. 2 is a schematic that illustrates transmitting antennas that transmit FMCW chirps that are modulated based upon phase rates of change that are uniquely assigned to the transmitting antennas.

Referring to FIG. 2, a schematic 200 depicting FMCW radar signals emitted by seven transmitting antennas having different phase rates of change assigned thereto is depicted. An FMCW signal 202 is output by the signal generator circuitry 106, where the FMCW signal 202 includes a sequence of frequency ramps that have linear slope. In the example depicted in FIG. 2, the transmitting antennas 110-112 include seven transmitting antennas. The first transmitting antenna 110 emits the FMCW signal 202; in other words, the first transmitting antenna 110 has a phase rate of change of 0 assigned thereto, such that each ramp emitted by the first transmitting antenna 110 does not have a phase offset relative to the FMCW signal 202. A second transmitting antenna has a phase rate of change assigned thereto of 90° per chirp, such that each chirp in the signal emitted by the second transmitting antenna has a phase offset of 90° relative to each adjacent chirp in such signal. A third transmitting antenna has a phase rate of change assigned thereto of 45° per chirp, such that each chirp in the signal emitted by the third transmitting antenna has a phase offset of 45° relative to each adjacent chirp in such signal. Continuing with the example illustrated in FIG. 2, the fourth transmitting antenna has a phase rate of change assigned thereto of 180° per chirp, the fifth transmitting antenna has a phase rate of change assigned thereto of 22.5° per chirp, the sixth transmitting antenna has a phase rate of change assigned thereto of 67.5° per chirp, and the seventh transmitting antenna has a phase rate of change assigned thereto of 135° per chirp. It can be ascertained that the phase rates of change assigned to the transmitting antennas 110-112 are non-uniformly distributed relative to one another, and thus velocity offsets corresponding to the transmitting antennas 110-112 are non-uniformly distributed relative to one another.

Returning to FIG. 1, the transmitting multiplexing scheme referenced above (referred to as a velocity labeled multiplexing (VLM) scheme)) is described in greater detail. As indicated above, the transmitting electronics 102 of the radar system 100 include N transmitting antennas (n=0, ..., N−1), where each transmitting antenna simultaneously emits L chirps (l=0, ..., l−1) with a defined pulse-repetition time ($T_{PRI}$) and a transmitter-specific phase-offset modulation which increments with the chirp number 1. For each of the transmitting antennas 110-112, this results in a linear phase increment from chirp to chirp, with a slope that is unique to each transmitting antenna in the transmitting antennas 110-112, The phase increment (phase rate of change) is selected such that signals from individual transmitting antennas are distributed as peaks, discreetly over the velocity dimension (Doppler-Division Multiplex) with velocity offsets, where the velocity offsets correspond to the phase increments. In effect, then, each of the transmitting antennas 110-112 is assigned a specific velocity label. The term "seed velocity gate" is employed to label each of the N peaks in the velocity spectrum caused by a single target—therefore, each of the seed velocity gates is relative to the actual velocity gate of the target and is subject to the velocity labels assigned to the transmitters.

With more specificity, transmitter n is modulated with a velocity label by multiplying the FMCW waveform generated by the signal generating electronics 106 with the following:

$$x_n(l) = e^{j2\pi \frac{velolabel\,(n)}{L}(l)} \quad (1)$$

where velolabel is an N-element vector that includes one velocity label entry per transmitting antenna, and the velocity label is an integer ranging from 0, ..., L−1. The factor $$\frac{velolabel\,(n)}{L}$$

is the phase rate of change (the slope of the phase increment from chirp to chirp). If a transmitter is labeled zero (e.g., such as the first transmitter 110 illustrated in FIG. 2), the transmitter is assigned a zero phase rate of change and therefore in the velocity spectrum the transmitter will cause a peak at the actual target velocity gate.

The effect of the modulation scheme described above is that a single target exhibits N spectral repetitions of velocity peaks in the velocity spectrum, with each assigned to one of the N transmitting antennas 110-112. Thus, the true velocity bin of the target is ambiguous, unless the assignment of the velocity peaks to the transmitters is known (which is discussed below).

As noted above, phase rates of change can be assigned to the transmitting antennas 110-112 such that the velocity offsets are uniformly distributed across the velocity spectrum, and thus differences between any two adjacent velocity peaks for a single target are equal. In such a scenario, identification of the true velocity can be accomplished through beamforming, and a virtual array can be designed to enable a high sidelobe level. When the velocity offsets are uniformly distributed across the velocity spectrum, the transmitting antennas 110-112 can be positioned non-uniformly with respect to one another to achieve desired sidelobe behavior. Contrarily, phase rates of change can be assigned to the transmitting antennas 110-112 such that the velocity offsets corresponding to the transmitting antennas 110-112 are non-uniformly distributed across the velocity spectrum. In such an approach, differences between any two adjacent velocity peaks for a single target are non-identical. This approach is advantageous in that sidelobe behavior is improved, and the transmitting antennas 110-112 can be included in sparse arrays or uniformly spaced.

Put differently, velocity labels can be uniformly distributed across a velocity spectrum, and transmitting antennas 110-112 are uniformly positioned relative to one another. In such a situation, after beamforming, detections (from all angles of arrival) have ambiguity in the velocity domain. In another example, velocity labels can be uniformly distributed across a velocity spectrum, and the transmitting antennas 110-112 can be non-uniformly distributed relative to one another. In this situation, after beamforming, detections from boresight targets have ambiguity in the velocity domain; for other detections, the gain in a true velocity bin is defined by a factor M (the number of receiving channels). In still yet another example, velocity labels can be non-uniformly distributed across a velocity spectrum, and the transmitting antennas 110-112 can be uniformly or non-uniformly positioned relative to one another. In such a scenario, after beamforming, detections (from all angle-of-arrival) are non-ambiguous with the gain in the true velocity bin defined by a factor M×N (the number of receivers multiplied by the number of transmitters). This results in a high signal to sidelobe level (and thus optimized detectability).

Reference is now made to the receiver electronics 104. The receiver electronics include M receiving antennas 118-120 that are configured to detect echo signals (reflections of the signals emitted by the transmitting antennas 110-112 off of objects in a scene) and output electrical signals that represent the detected echo signals. The receiver electronics 104 also include M amplifiers 122-124 that are respectively coupled to the receiving antennas 118-120, where the amplifiers 122-124 amplify electrical signals output by the receiving antennas 118-120.

The receiver electronics 104 further include mixers 126-128 that are respectively configured to downmix the amplified electrical signals output by the amplifiers 122-124 with a local oscillator (LO), thereby forming downmixed signals. In an example, the power divider 108 is configured to direct copies of the FMCW signal output by the signal generator circuitry 106 to the mixers 126-128, such that the FMCW signal is the LO.

The receiver electronics 104 also include low pass filters 130-132 that are respectively electrically coupled to the mixers 128-130 and are configured to filter higher frequencies from the downmixed signals output by the mixers 128-130 and output filtered signals, where the filtered signals include frequencies in the baseband spectrum of the radar system 100. While not shown, the receiver electronics 104 optionally include second amplifiers that are respectively coupled to the low pass filters 130-132, where such amplifiers are configured to amplify the filtered signals.

The receiver electronics 104 further include analog to digital converters (ADCs) 134-136 that convert the filtered signals output by the low pass filters 130-132 from analog signals to digital signals, thereby outputting M digital signals. The receiver electronics 104 additionally include processing circuitry 138 that processes digital signals output by the ADCs 134-136. In an example, the processing circuitry 138 is or includes a digital signal processor (DSP), although other types of processing circuitry are contemplated. The processing circuitry 138 includes a range module 140, a doppler module 142, a beamformer module 144, and a detector module 146. In addition, the processing circuitry optionally includes a predetector module 148. Operation of the modules 140-148 with respect to the digital signals output by the ADCs 134-136 is described in detail below.

There are two different approaches contemplated for processing echo signals that are based upon the modulated signals emitted by the transmitting antennas 110-112. The first approach includes a sequence of acts for estimating range, velocity, and angle of an object relative to the radar system 100. The second approach includes a sequence of acts that are configured to reduce an amount of data processed by the processing circuitry 138 by exploiting properties of the VLM approach.

The first approach is set forth herein. The range module 140 samples from the digital signals output by the ADCs 134-136 with respect, to an individual chirp (fast time), and performs a Fast Fourier Transform (FFT) of such samples (from each receive channel) to obtain a range spectrum (e.g., a range gate from 0 to K−1).

Figure 3:
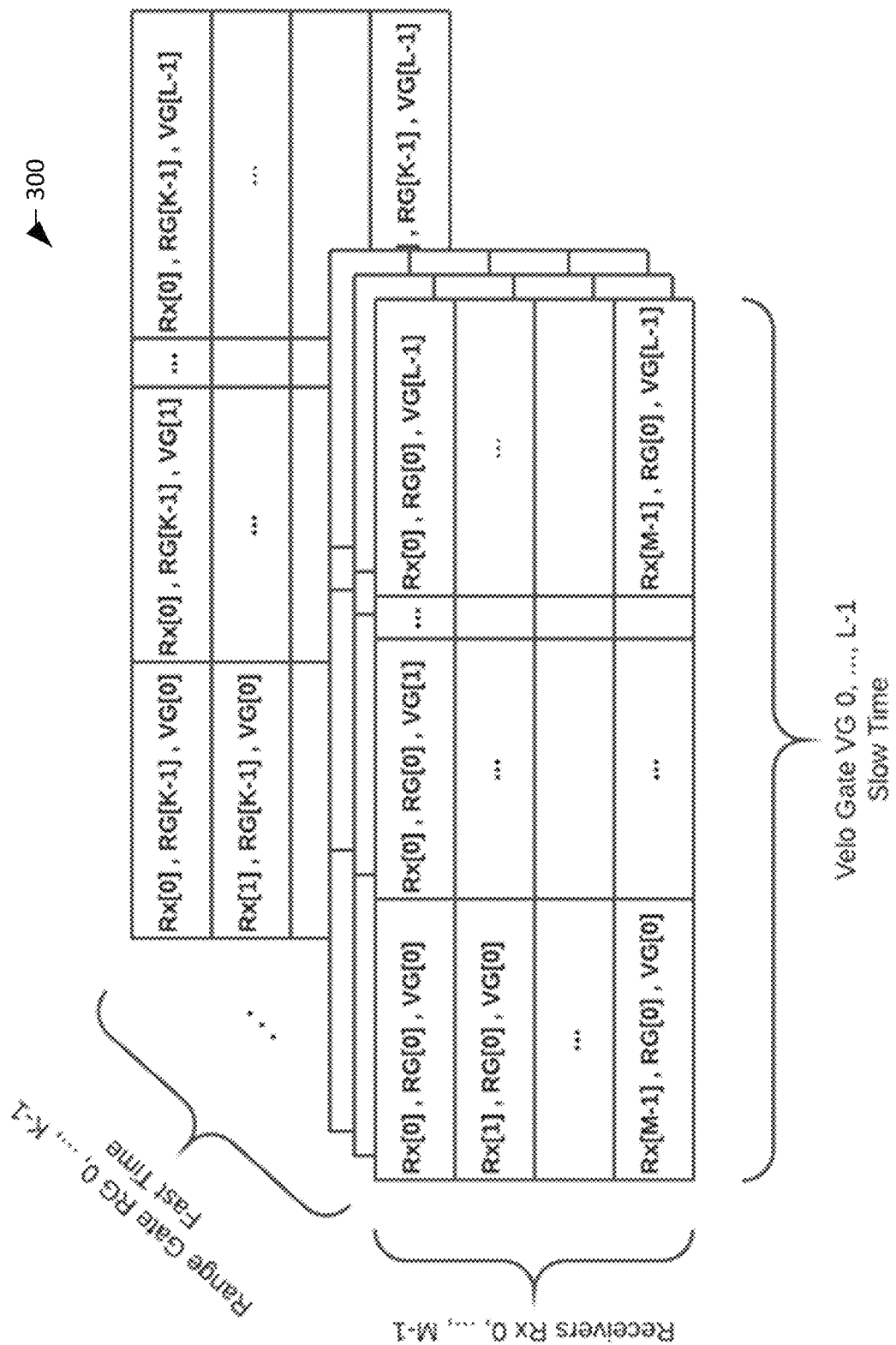
FIGS. 3 & 4 illustrate example multi-dimensional data matrices.

The doppler module 142 performs a second FFT over slow time samples (a sequence of consecutive chirps) per receive channel, thereby obtaining characteristic peaks in the velocity spectrum that are offset from one another in correspondence with the phase change rates assigned to the transmitting antennas 110-112. The doppler module 142 can arrange the data set of one coherent processing interval in a three-dimensional complex-valued matrix (data cube) represented as follows:

$$mat_{CPI}(Rx_m, RG_k, VG_l) \qquad (2)$$

with dimensions range gates (RG), velocity gates (VG), and receive channels (Rx), as illustrated by the data cube 300 depicted in FIG. 3.

The doppler module 142 can additionally perform transmitter demultiplexing (e.g., extraction of virtual receivers corresponding to individual transmitting antennas). With more particularity, at such stage (when the data cube is produced), transmitter demultiplexing has yet to be performed. Transmitter demultiplexing may be performed prior to the second FFT being performed; however, this would lead to an increase in data load by a factor of N. Thus, to keep the data set as small as possible for as long as possible (and thereby reduce an amount of computational resources needed to process the data), the doppler module 142 can perform transmitter demultiplexing after the second FFT is performed (the velocity FFT).

For transmitter demultiplexing, the doppler module 142 can extract the virtual array of an individual transmitting antenna in each range-velocity gate from this data set, where the doppler module 142 takes into account the velocity label vlTx$_n$ assigned to the particular transmitting antenna. The velocity labels are stored in the vector velolabel(n)=(vlTx$_0$, vlTx$_1$, ..., vlTx$_{N-1}$)$^T$, sorted from n=0 to N−1, where n is assigned to individual transmitting antennas in the transmitting antennas 110-112. An extraction method that can be employed by the doppler module 142 for a single range gate sample of the mth virtual receiver Rx$_m^{Tx_n}$ corresponding to the nth transmitter in the lth velocity gate is based on modulo operation in the velocity dimension:

$$Rx\frac{Tx_n}{m} = mat_{CPI}(Rx_m, RG_k, \mathrm{mod}(VG_l + vlTx_n, L)). \qquad (3)$$

Figure 4:
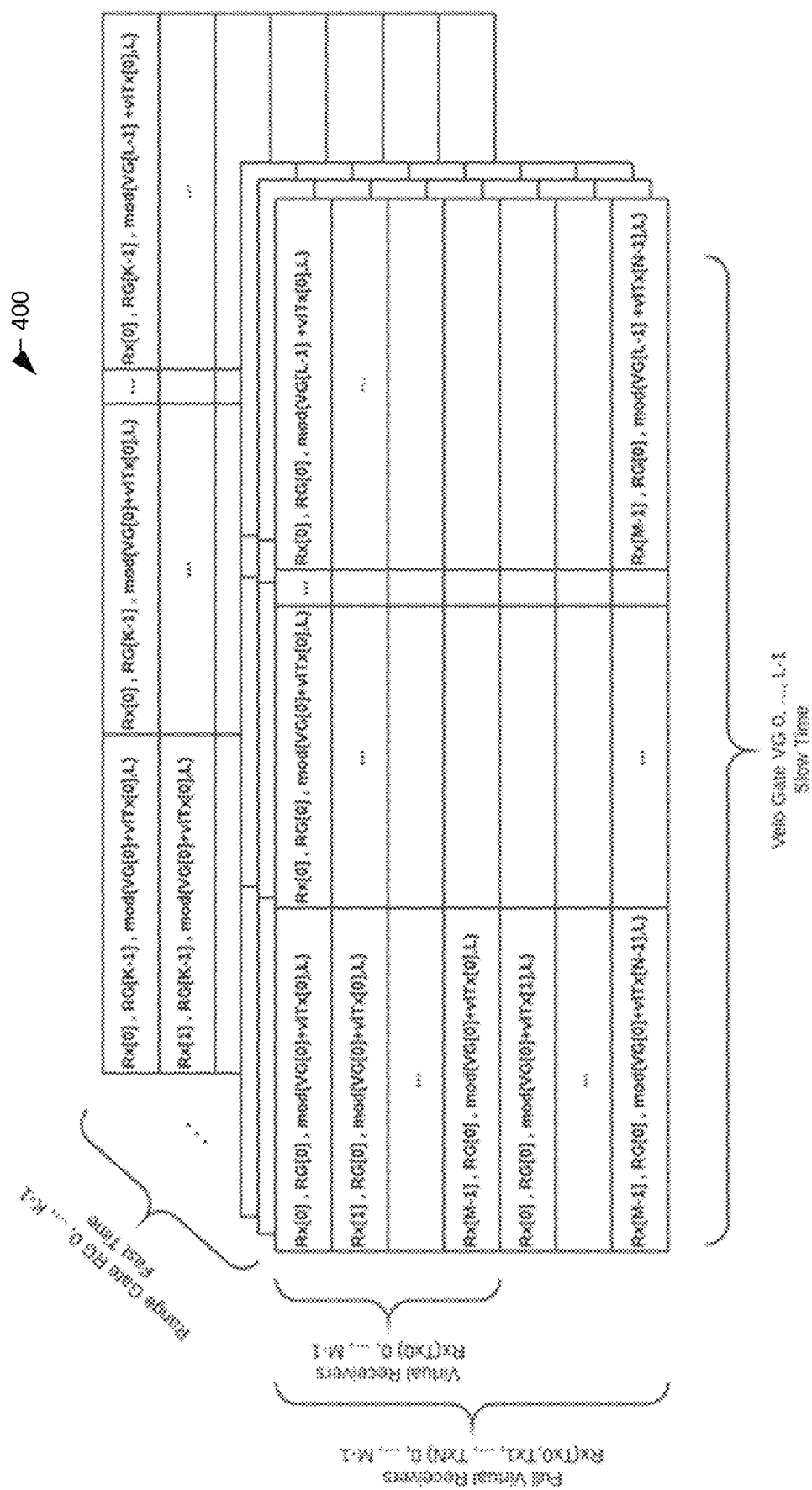

Applying this extraction approach throughout the Rx, RG, and VG dimensions of the data cube results in an extended data cube with transmitter de-multiplexing, as illustrated by the extended data cube 400 shown in FIG. 4.

The beamformer module 146 performs beamforming on data in the extended data cube, where beamforming is applied on the total of M×N virtual receivers in each range-velocity gate. Due to the VLM modulation described above, a single target energy in one range gate is distributed over the velocity dimension into N discrete velocity bins (as defined by the velocity labels and relative to the actual radial velocity of the target). An effect is that after beamforming, the velocity spectrum exhibits discrete sidelobes together with the mainlobe located at the true velocity gate of the target. Sidelobe levels are generally determined by the design of the array of transmitting antennas 110-112 and the design of the velocity labels. The minimum signal-to-sidelobe ratio (SSLR) is a function of the total number of transmitters N:

$$SSLR(N)=20\cdot(N). \qquad (4)$$

Due to the predefined velocity-gate iteration (by velocity labels) and modulo operations in the demultiplexing procedure, velocity sidelobes occur with a deterministic number and at deterministic locations. Thus, for a single target, the number of velocity sidelobes is N(N−1). Generally, the minimum sidelobe levels and the number of velocity sidelobes can be reduced through design of the array of transmitting antennas 110-112 and phase rates of change assigned to the transmitting antennas 110-112.

In an example, the beamformer module 144 can additionally perform interference detection and filtering. Interference of two or more targets can occur if, prior to demultiplexing, there is at least one overlapping peak in the velocity dimension that corresponds to the two or more targets. Thus, two targets o$_1$ and o$_2$, whose true velocities resolve into two velocity gates vo$_1$ and vo$_2$ interfere if the condition $$\mathrm{mod}(vg_{o_1}+vltx_{n_1},L)==\mathrm{mod}(vg_{o_2}+vlTx_{n_2},L) \qquad (5)$$

for any n$_1$∈n, n$_2$∈n and n=0, ..., N−1 is met. If the beamformer module 144 performs beamforming on range-velocity gates that are subject to such interference, the beamformer module 144 can produce a degraded beam spectrum. Therefore, the beamformer module 144 can filter out such range-velocity gates.

The beamformer module 144 can filter interference before or after performing beamforming, depending upon the signal processing chain. Moreover, the beamformer module 144 can be designed, in the present of interference, to filter out all interfering targets O. In another example, the beamformer module 144 can be configured to use additional criteria when performing filtering, such as signal strengths of individual targets.

The detector module 146 can identify a detection based upon the processed CPI data cube:

$$mat_{CPI}(BG_b, RG_k, VG_l), \qquad (6)$$

which has dimensions beam gate (BG), from b=0, ... B−1, range gate (RG), and velocity gate (VG). It can be ascertained that such notation does not differentiate between horizontal and vertical beam gates; however, the matrix can be arranged to explicitly include two beam gate dimensions.

The optimized processing approach is now set forth, where the predetector module 148 is employed. The optimized processing approach is designed to efficiently employ hardware resources of the radar system 100 in terms of utilization as well as timing. Use of the optimized processing approach described herein results in reduced data load prior to beamforming, as the predetector module 148 (as will be described below) detects targets and identifies their range and velocity information; thereafter, the detected range-velocity gates are provided to the beamformer module 144 for calculation of the angular information for the targets. Accordingly, the steps prior to the second FFT being performed for velocity computation are identical in the optimized processing approach to those described above with respect to the first approach.

In the second processing approach, the doppler module 142 generates a two-dimensional heat map using the velocity processing data by integrating the M receivers in a non-coherent fashion—e.g.:

$$\text{heat map } (k, l) = \sum_{m=0}^{M-1} \text{abs}(\text{mat}_{CPI}(Rx_m, RG_k, VG_l)). \quad (7)$$

It is to be noted that other non-coherent integrations are also contemplated, such as summation on log(.), abs(.)$^2$, etc. The predetector module 148 receives the heat map data, which detects range-velocity gates of potential targets and performs VLM demultiplexing.

The predetector module 148 performs the following acts for every range-gate and for the first fraction of the velocity spectrum that is given by the largest distance between two subsequent velocity labels:

$$I_{velo\ fraction} = \max_{n=0,\ldots,N-1}\{\text{mod}(\text{velolabel}(\text{mod}(n+1, N))-\text{velolabel}(n),L)\}, \quad (8)$$

where $I_{velo\ fraction}$ is the size of the velocity fraction, ranging from velocity gates 0, . . . , $I_{velo\ fraction}-1$.

The predetector module 148 treats each velocity gate in the velocity fraction as a seed velocity gate; for each seed velocity, N possible true velocities can be assumed (based upon the phase rate of change assigned to the transmitting antennas 110-112). This is illustrated in the first column of Table 1, set forth below. For the N possible true velocities, the relative positions of other velocity peaks associated with the same target can be calculated, as illustrated row-wise in Table 1.

The true velocity possibility $l_{true\ velo} \in \{vgSeed-vlTx\ 0, \ldots, vgSeed-vlTxN-1$ that maximizes the magnitude of eq. (7) for range gate k identifies the true velocity gate. This applies to any column of table 1. A threshold detector can be applied on the magnitude of heat map(k, $l_{true\ velo}$) to detect potential targets in the respective range-velo gates. A disadvantage of this approach is that the first detector is applied on the heat map data (eq. (7)), which has yet only experienced the non-coherent integration gain of M receivers instead of that of the full M×N virtual receiver array. This reduces the sensitivity of the predetector module 148 towards weaker targets.

To improve the non-coherent integration gain in the predetector module 148, the heat map data can be further processed to capture the full virtual receiver array (or alternatively any sub-array that can be formed from the N transmitters and M receivers). For this purpose, the true velocity possibilities $l_{true\ velo}$ can be summed up column-wise, where the number of columns taken into account corresponds to the number of transmitters involved in the formation of the sub-array (e.g., up to N columns for the full virtual receiver array). Effectively, then, $$\frac{N!}{(N-n_{use})! n_{use}!} \quad (9)$$

sub-arrays can be created for true velocity gate identification and detection for an arbitrary sub-array with $n_{use}$ involved transmitters. To achieve high non-coherent integration gain, it is desirable to use N transmitters in this step; however, this reduces the dynamic range for the predetector module 148, because the higher the number of transmitters involved in the integration process, the higher the number of velocity side lobes resulting in the velocity spectrum—e.g., $n_{use}$ ($n_{use}-1$).

In another approach, the predetector module 148 can use a range-dependent number of transmitters for true velocity gate identification and detection. In particular, the number of transmitters involved in the non-coherent integration process are increased with the range of the potential target. This is due to the fact that targets at further distances require higher sensitivity of the detector to be detected. Thus, the farther the potential target is located in a range gate, the more transmitters are used for the non-coherent integration process.

TABLE 1

| true velocity possibility based on seed velo gate vgSeed | Tx0 | Tx1 | ... TxN-1 |
|---|---|---|---|
| vgSeed-vlTx0 | vgSeed | (vgSeed-vlTx0 + vlTx1)mod L | ... (vgSeed-vlTx0 + vlTxN-1)mod L |
| vgSeed-vlTx1 | (vgSeed-vlTx1 + vlTx0)mod L | vgSeed | ... ... |
| ... | ... | ... | ... ... |
| vgSeed-vlTxN-1 | (vgSeed-vlTxN-1 + vlTx0)mod L | ... | ... vgSeed |

The predetector module 148 can use a single or another fixed number of transmitters for true velocity gate identification (e.g., information required for VLM demultiplexing) and detection. Initially, an approach using a single transmitter is described, followed by an approaching using an arbitrary number of transmitters.

This approach is desirable because it balances the advantages and disadvantages of using only one transmitter versus that of all N transmitters in the non-coherent integration process.

The beamformer module 144 can apply beamforming for the range-velocity gates of the potential target identified by the predetector module 148. The detector module 146 then makes a detection in the beam dimension. It is possible to subsequently apply an interference filter as described in the previously described (first) process. Alternatively, the interference filter can be applied at the output of the predetector module 148, which results in fewer range-doppler detections to be passed to the beamformer module 144 (thereby saving processing resources).

Figure 6:
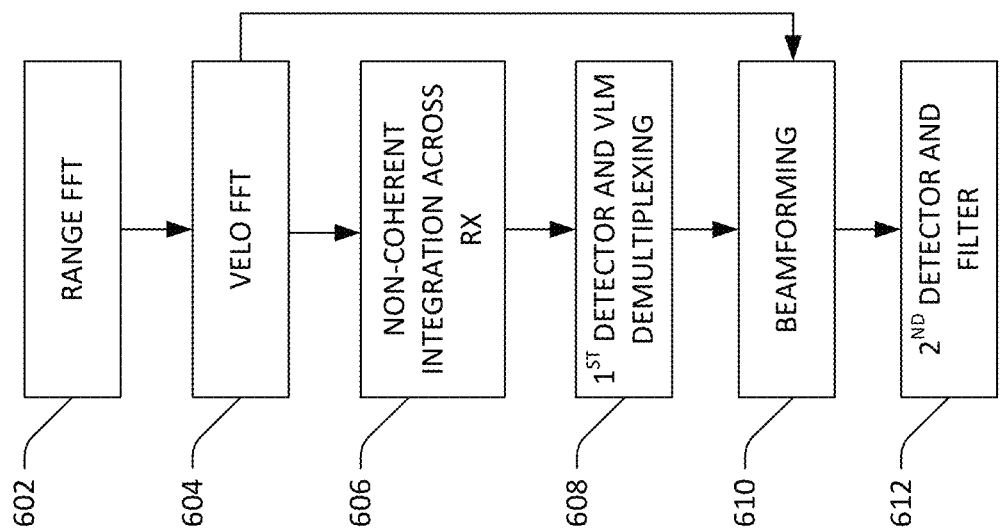
FIG. 6 is a flow diagram that illustrates another method for generating a radar detection of an object.
Figure 5:
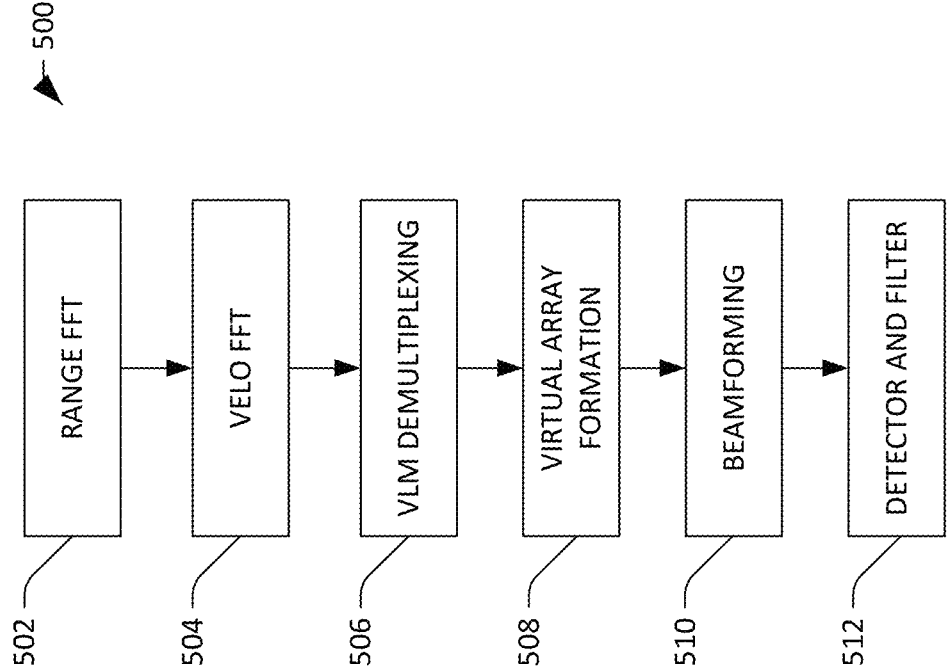
FIG. 5 is a flow diagram that illustrates a method for generating a radar detection for an object.
Figure 7:
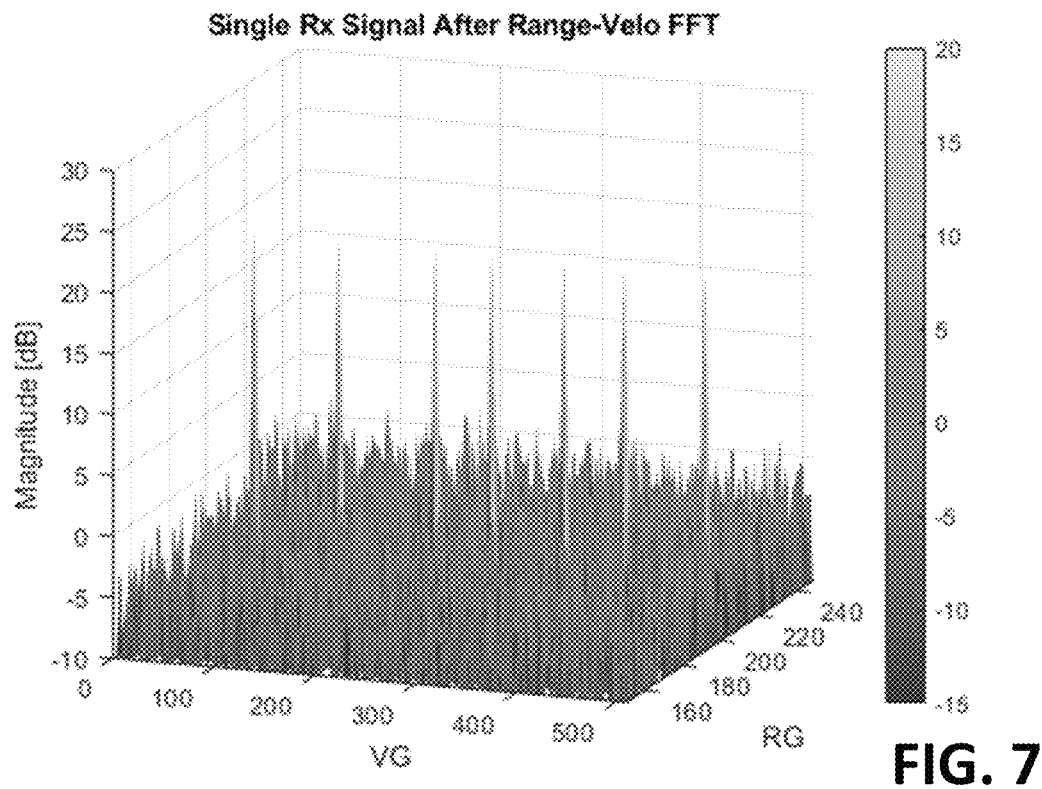
FIGS. 7-12 are plots that graphically depict processing performed based upon data detected by receivers in a radar system.
Figure 8:
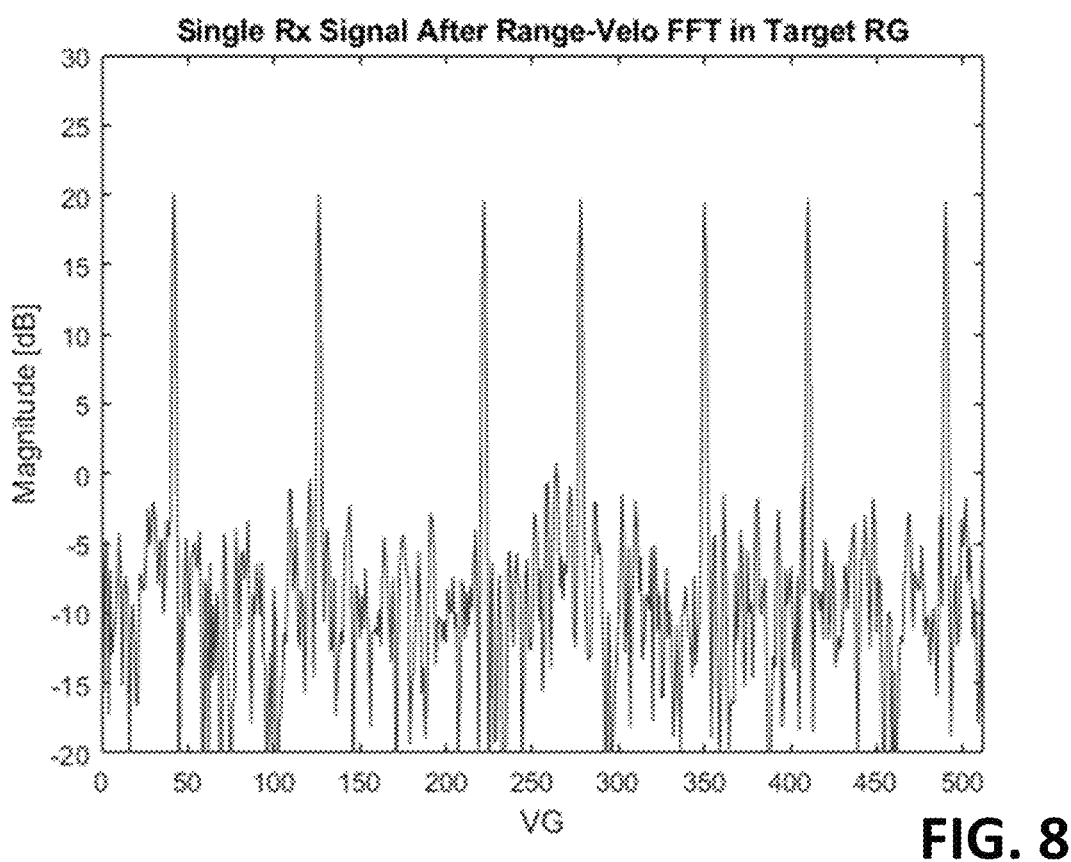
Figure 9:
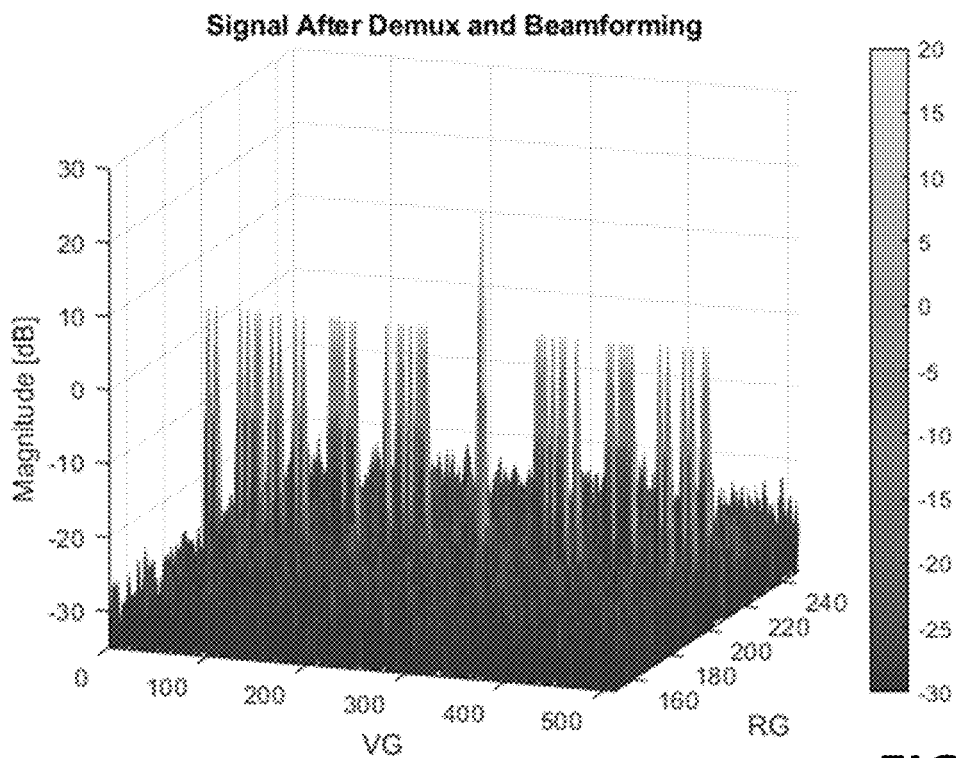
Figure 10:
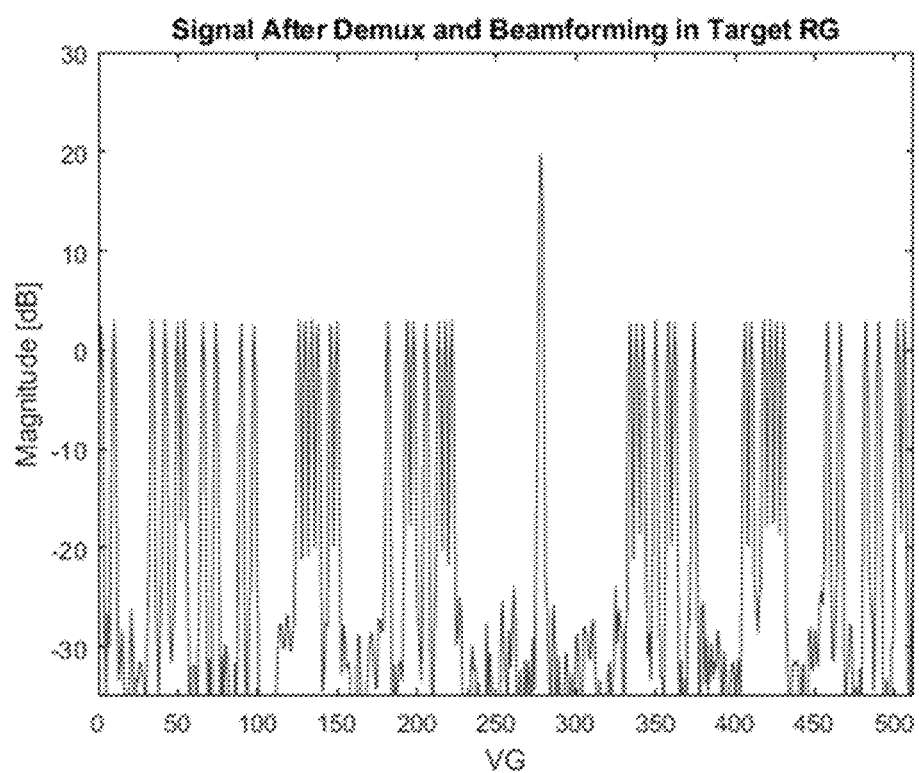
Figure 11:
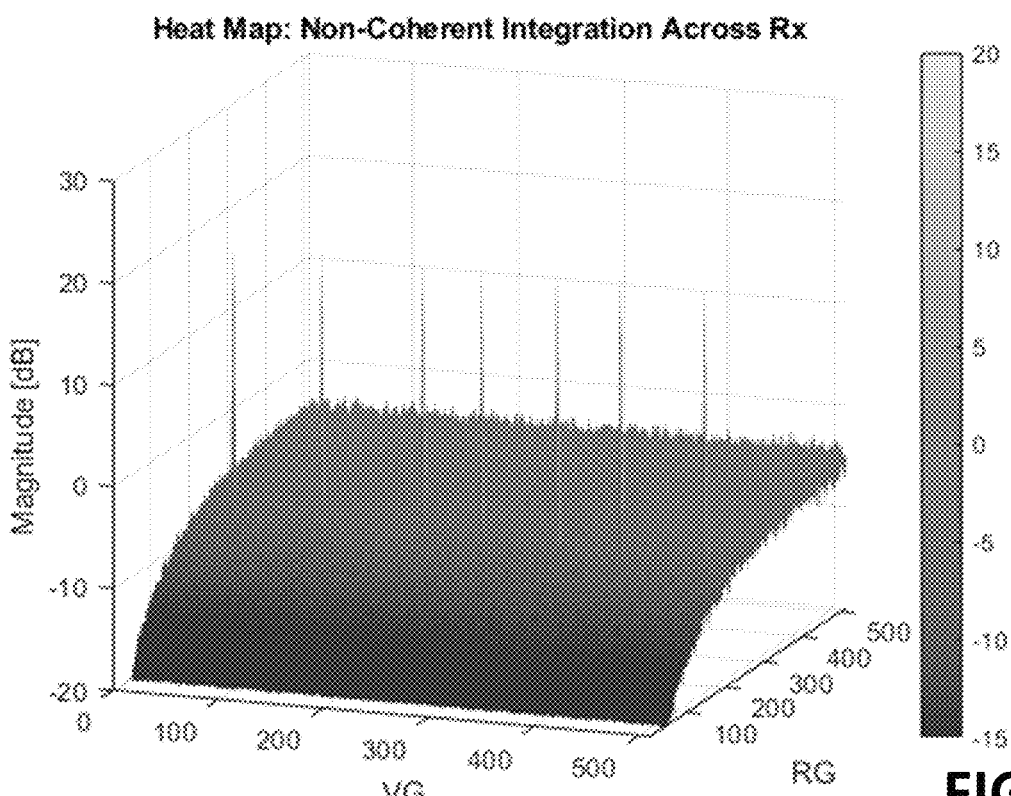
Figure 12:
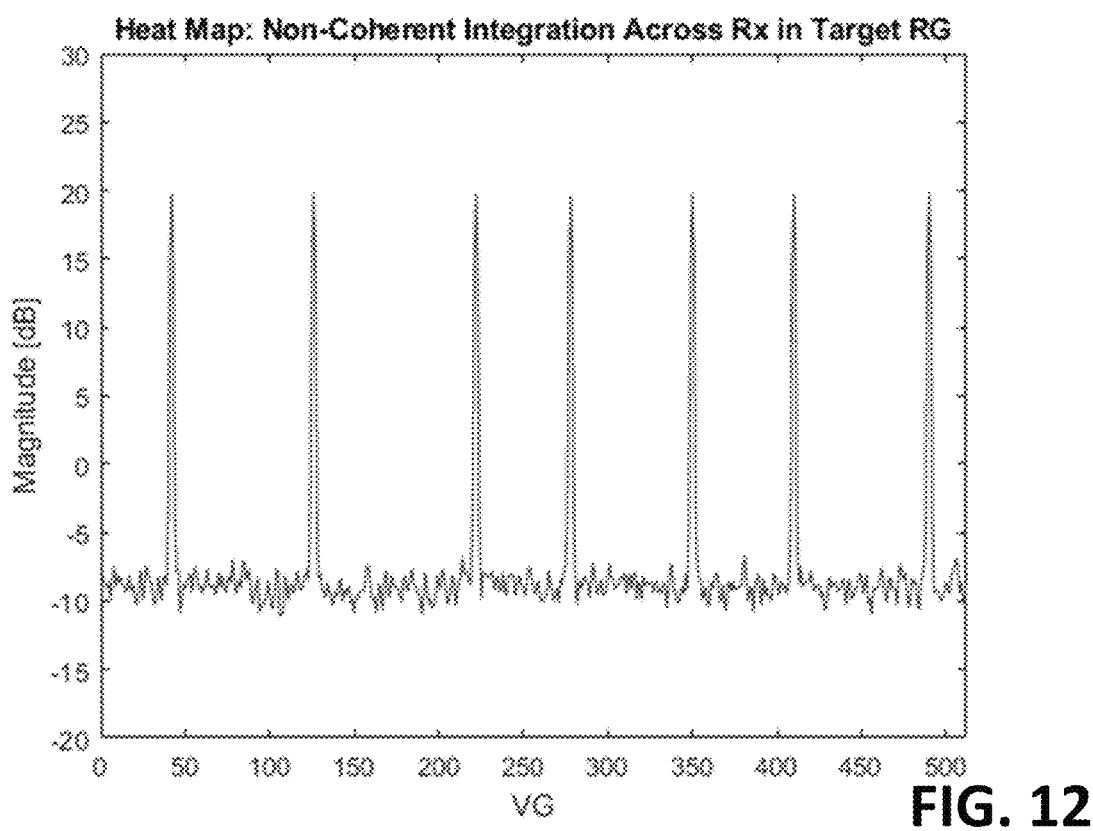

FIGS. 5 and 6 illustrate methodologies for processing radar data to compute information about an object in a scene. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, a methodology 500 that can be performed by the processing circuitry 138 of the radar system 100 is illustrated. At 502, a range FFT is performed with respect to samples of data (fast time) received from the ADCs 134-136 to determine range bins for targets in a scene. At 504, a velocity FFT is performed with respect to samples of data (slow time) received from the ADCs 134-136 to determine (ambiguous) velocity bins for the targets in the scene. At 506, VLM demultiplexing is performed to construct a multi-dimensional data matrix, such as depicted in FIG. 4. At 508, virtual array formation is performed by extracting arrays from the multi-dimensional matrix that correspond to each transmitter. At 510, beamforming is performed on each virtual array formed at 508, and at 512, a detector detects targets and filters interfering targets.

Referring to FIG. 6, an alternate methodology 600 that can be performed by the processing circuitry 138 of the radar system 100 is presented. At 602, a range FFT is performed with respect to samples of data (fast time) received from the ADCs 134-136 to determine range bins for targets in a scene. At 604, a velocity FFT is performed with respect to samples of data (slow time) received from the ADCs 134-136 to determine (ambiguous) velocity bins for the targets in the scene. At 606, non-coherent integration is performed across receivers in the radar system 100, and at 608 a first detection is performed and demultiplexing is performed in order to compute velocities for the targets. At 610, beamforming is applied using the detected velocities as well as data corresponding to the detected velocities acquired during the velocity FFT at 604. At 612, a second detection is performed to assign angular information to the targets (and optionally filtering is undertaken to filter interfering targets).

FIGS. 7-12 depict signals generated by the processing circuitry 138 when processing data received from the ADCs 134-136, and are set forth for purposes of illustration.

Figure 13:
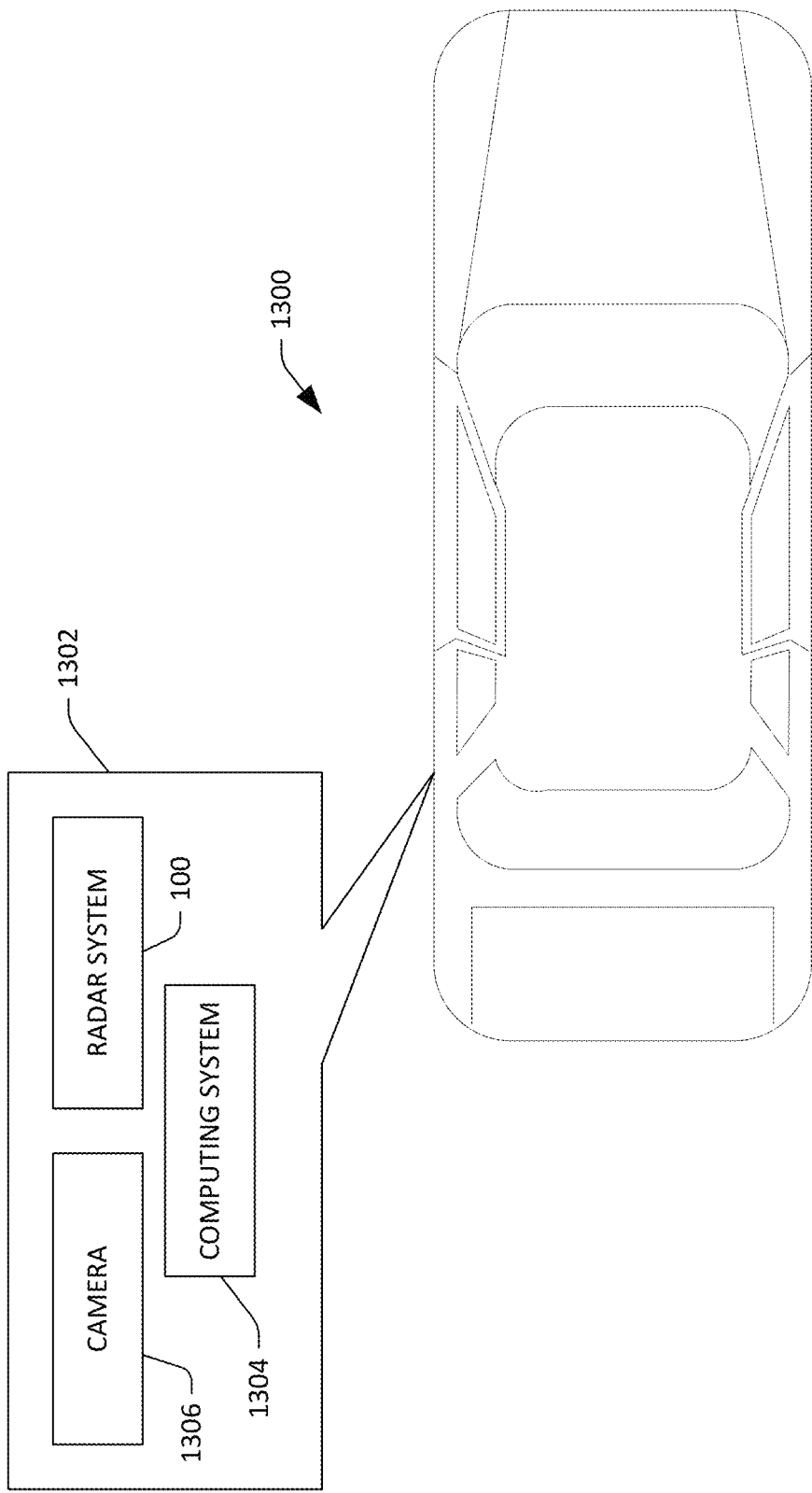
FIG. 13 is a schematic that illustrates an autonomous vehicle (AV).

FIG. 13 is a schematic of an autonomous vehicle (AV) 1300. As illustrated in callout 1302, the AV 1300 includes the radar system 100. In addition, the AV 1300 includes a computing system 1304 that is in communication with the radar system 100, where the computing system 1304 is in communication with systems of the AV 1300, such as a propulsion system (e.g., an electric motor, a combustion engine, etc.), a braking system, a steering system, etc. The AV 1300 also optionally includes a camera 1306 that is in communication with the computing system 1304. While not illustrated, the AV 1300 can also optionally include other sensor systems, such as a LIDAR sensor system, a positional sensor system (such as a GPS sensor system), an accelerometer, etc. The computing system 1300 receives detections output by the radar system 100 (and optionally images output by the camera 1306 and/or other sensor systems) and causes the AV 1300 to plan and/or perform a driving maneuver based upon the detections. For instance, the computing system 1300 can, based upon the detections, control the propulsion system to cause the AV 1300 to accelerate, to maintain a constant velocity, to decelerate, etc. In another example, the computing system 1304 can, based upon the detections, control the braking system to initiate braking, to release from braking, etc. In still yet another example, the computing system 1304 can, based upon the detections, control the steering system to turn, to maintain course, etc. The AV 1300 may be a fully autonomous vehicle. In other examples, the radar system 100 can be employed in a partially autonomous vehicle, where detections can be employed by driver assistance technologies.

Figure 14:
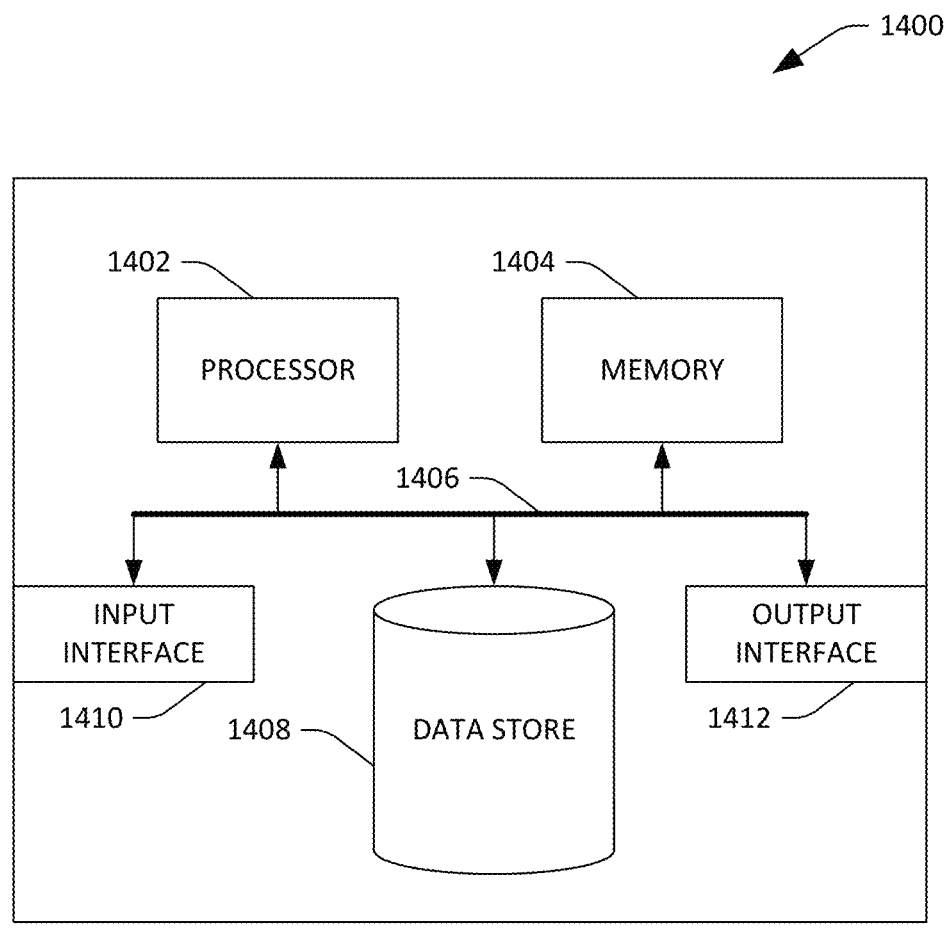
FIG. 14 depicts a computing device.

Referring now to FIG. 14, a high-level illustration of an exemplary computing device 1400 that can be used in accordance with the systems and methodologies disclosed herein is illustrated. For instance, the computing device 1400 may be or be included within the radar system 100 and/or the AV 1300. The computing device 1400 includes at least one processor 1402 that executes instructions that are stored in a memory 1404. The instructions may be, for instance, instructions for implementing functionality described as being carried out by one or more systems discussed above or instructions for implementing one or more of the methods described above. The processor 1402 may be a GPU, a plurality of GPUs, a CPU, a plurality of CPUs, a multi-core processor, etc. The processor 1402 may access the memory 1404 by way of a system bus 1406. In addition to storing executable instructions, the memory 1404 may also store range data, velocity data, velocity labels, etc.

The computing device 1400 additionally includes a data store 1408 that is accessible by the processor 1402 by way of the system bus 1406. The data store 1408 may include executable instructions, range data, velocity data, velocity labels, etc. The computing device 1400 also includes an input interface 1410 that allows external devices to communicate with the computing device 1400. For instance, the input interface 1410 may be used to receive instructions from an external computer device, etc. The computing device 1400 also includes an output interface 1412 that interfaces the computing device 1400 with one or more external devices. For example, the computing device 1400 may transmit control signals to the engine 106, the braking system 108, and/or the steering system 110 by way of the output interface 1412.

Additionally, while illustrated as a single system, it is to be understood that the computing device 1400 may be a distributed system. Thus, for instance, several devices may be in communication by way of a network connection and may collectively perform tasks described as being performed by the computing device 1400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The features described herein relate to a (fast-ramp) FMCW MIMO radar system according to at least the examples provided below.

(A1) In one aspect, some embodiments include a method performed by a fast ramp FMCW radar system. The method includes generating, by a signal generator of the FMCW radar system, a signal. The method also includes, based upon the signal, transmitting, by multiple transmitting antennas of the FMCW radar system, transmit signals that include respective sequences of chirps, where the transmit signals are assigned differing phase rates of change that respectively correspond to velocity offsets in a velocity spectrum of a receiver of the fast ramp FMCW radar system, where the velocity offsets are non-uniformly distributed across the velocity spectrum of the receiver of the fast ramp FMCW radar system.

(A2) In some embodiments of the method of (A1), transmitting the transmit signals includes: transmitting, by a first transmitting antenna in the multiple transmitting antennas, a first transmit signal that includes a first sequence of chirps, where the first sequence of chirps includes a first chirp having a first phase immediately followed by a second chirp having a second phase, and further where a difference between the first phase and the second phase is based upon a first phase rate of change assigned to the first transmitting antenna. The method also includes transmitting, by a second transmitting antenna in the multiple transmitting antennas, a second transmit signal that includes a second sequence of chirps, wherein the second sequence of chirps includes a third chirp having a third phase immediately followed by a fourth chirp having a fourth phase, and further wherein a difference between the third phase and the fourth phase is based upon a second phase rate of change assigned to the second transmitting antenna, the first phase rate of change being different from the second phase rate of change.

(A3) In some embodiments of the method of (A2), the first transmitting antenna is horizontally displaced from the second transmitting antenna.

(A4) In some embodiments of any of the methods of (A2)-(A3), the first transmitting antenna is vertically displaced from the second transmitting antenna.

(A5) In some embodiments of any of the methods of (A1)-(A4), the multiple transmitting antennas are included in a two-dimensional array of transmit antennas.

(A6) In some embodiments of any of the methods of (A1)-(A5), the multiple transmitting antennas include between two and fifty antennas that are uniformly spaced with respect to one another.

(A7) In some embodiments of any of the methods of (A1)-(A5), the multiple transmitting antennas include between two and fifty antennas that are non-uniformly spaced with respect to one another.

(A8) In some embodiments of any of the methods of (A1)-(A7), the method further includes: detecting, by a receiving antenna, an echo signal, the echo signal based upon at least one transmit signal emitted by at least one transmitting antenna; and computing a velocity of an object relative to the FMCW radar system based upon the echo signal.

(A9) In some embodiments of any of the methods of (A1)-(A8), the method further includes controlling at least one of a propulsion system, a braking system, or a steering system of an autonomous vehicle (AV) based upon the computed velocity of the object relative to the FMCW radar system.

(B1) In another aspect, some embodiments include a method that includes generating, by a signal generator of a fast ramp FMCW radar system of an AV, a signal. The method also includes, based upon the signal, transmitting, by multiple transmitting antennas of the fast ramp FMCW radar system, transmit signals that include respective sequences of chirps, wherein the transmit signals are assigned differing phase rates of change that respectively correspond to velocity offsets in a velocity spectrum of a receiver of the fast ramp FMCW radar system, where the velocity offsets are non-uniformly distributed across the velocity spectrum of the receiver of the fast ramp FMCW radar system.

(B2) In some embodiments of the method of (B1), a computing system is in communication with the fast ramp FMCW radar system, where the fast ramp FMCW radar system is configured to compute a velocity of an object relative to the fast ramp FMCW radar system based upon at least one transmit signal in the transmit signals, and further where the computing system is configured to control at least one of a propulsion system, a braking system, or a steering system of the AV based upon the computed velocity of the object relative to the fast ramp FMCW radar system.

(B3) In some embodiments of any of the methods of (B1)-(B2), there are between two and fifty transmitting antennas in the multiple transmitting antennas.

(C1) In yet another aspect, some embodiments include an FMCW radar system that is configured to perform any of the methods described herein (e.g., any of (A1-A9) and/or any of (B1)-(B3)).

(D1) In still yet another aspect, some embodiments include an AV that comprises an FMCW radar system, where the FMCW radar system is configured to perform any of the methods described herein (e.g., any of (A1-A9) and/or any of (B1)-(B3)).

(E1) In another aspect, some embodiments include a fast ramp FMCW radar system, where the radar system includes a signal generator that generates a signal. The radar system also includes an array of transmitting antennas that simultaneously emit respective sequences of chirps based upon the signal generated by the signal generator, where each transmitting antenna in the array of transmitting antennas generates a unique velocity offset within a velocity spectrum of the FMCW radar system, and further where the velocity offsets that are respectively generated by the transmitting antennas in the array are non-uniformly distributed over the velocity spectrum of an FMCW radar receiver of the FMCW radar system.

(E2) In some embodiments of the FMCW radar system of (E1), the array of transmitting antennas includes between two and fifty antennas.

(E3) In some embodiments of any of the FMCW radar systems of (E1)-(E2), the transmitting antennas in the array of transmitting antennas are uniformly spaced with respect to one another.

(E4) In some embodiments of any of the FMCW radar systems of (E1)-(E2), the transmitting antennas in the array of transmitting antennas are non-uniformly spaced with respect to one another.

(E5) In some embodiments of any of the FMCW radar systems of (E1)-(E4), the array of transmitting antennas is a two-dimensional array with antennas arranged horizontally and vertically offset from one another.

(E6) In some embodiments of any of the FMCW radar systems of (E1)-(E5), the FMCW radar system includes: a receiving antenna that is configured to receive an echo signal that corresponds to a sequence of chirps emitted by an antenna in the array of transmitting antennas; and processing circuitry that is coupled to the receiving antenna, where the processing circuitry generates a detection based upon the echo signal, and further where the detection includes a range of an object between the FMCW radar system and the object, a velocity of the object relative to the FMCW radar system, and an angle of the object relative to the FMCW radar system.

(E7) In some embodiments of any of the FMCW radar systems of (E1)-(E6), the fast ramp FMCW radar system is included in an AV, where the AV performs a driving maneuver based upon the detection.

(E8) In some embodiments of any of the FMCW radar systems of (E1)-(E7), the radar system further includes an array of receiving antennas that detect echo signals, the echo signals are based upon the sequences of chirps emitted by the array of transmitting antennas. The radar system also includes processing circuitry that is in communication with the receiving antennas, wherein the processing circuitry computes a velocity of an object relative to the FMCW radar system based upon the echo signals.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A fast ramp frequency-modulated continuous wave (FMCW) radar system comprising:
    a signal generator that generates a signal; and
    an array of transmitting antennas that simultaneously emit respective sequences of chirps based upon the signal generated by the signal generator, wherein each transmitting antenna in the array of transmitting antennas has a unique phase rate of change assigned thereto, where each unique phase rate of change corresponds to a velocity offset within a velocity spectrum of the fast ramp FMCW radar system such that each transmitting antenna in the array of transmitting antennas is assigned a unique velocity offset within the velocity spectrum, wherein the velocity offsets that are respectively assigned to the transmitting antennas in the array are non-uniformly distributed over the velocity spectrum of the fast ramp FMCW radar system, and further wherein a whole number results when a multiple of 360 is divided by each unique phase rate of change.

2. The fast ramp FMCW radar system of claim 1, wherein the array of transmitting antennas comprises between two and fifty antennas.

3. The fast ramp FMCW radar system of claim 1, wherein the transmitting antennas in the array of transmitting antennas are uniformly spaced with respect to one another.

4. The fast ramp FMCW radar system of claim 1, wherein the transmitting antennas in the array of transmitting antennas are non-uniformly spaced with respect to one another.

5. The fast ramp FMCW radar system of claim 1, wherein the array of transmitting antennas is a two-dimensional array with antennas arranged horizontally and vertically offset from one another.

6. The fast ramp FMCW radar system of claim 1, further comprising:
    a receiving antenna that is configured to receive an echo signal that corresponds to a sequence of chirps emitted by an antenna in the array of transmitting antennas; and
    processing circuitry that is coupled to the receiving antenna, wherein the processing circuitry generates a detection based upon the echo signal, and further wherein the detection includes a range of an object between the FMCW radar system and the object, a velocity of the object relative to the FMCW radar system, and an angle of the object relative to the FMCW radar system.

7. The fast ramp FMCW radar system of claim 6 included in an autonomous vehicle (AV), wherein the AV performs a driving maneuver based upon the detection.

8. The fast ramp FMCW radar system of claim 1, further comprising:
    an array of receiving antennas that detect echo signals, the echo signals are based upon the sequences of chirps emitted by the array of transmitting antennas; and
    processing circuitry that is in communication with the receiving antennas, wherein the processing circuitry computes a velocity of an object relative to the FMCW radar system based upon the echo signals.

9. A method comprising:
    generating, by a signal generator of a fast ramp frequency modulated continuous wave (FMCW) radar system, a signal; and based upon the signal, transmitting, by multiple transmitting antennas of the fast ramp FMCW radar system, transmit signals that include respective sequences of chirps, wherein the transmit signals are assigned differing phase rates of change that respectively correspond to velocity offsets in a velocity spectrum of a receiver of the fast ramp FMCW radar system, wherein the velocity offsets are non-uniformly distributed across the velocity spectrum of the receiver of the fast ramp FMCW radar system, and further wherein a whole number results when a multiple of 360 is divided by each phase rate of change.

10. The method of claim 9, wherein transmitting the transmit signals comprises:
transmitting, by a first transmitting antenna in the multiple transmitting antennas, a first transmit signal that includes a first sequence of chirps, wherein the first sequence of chirps includes a first chirp having a first phase immediately followed by a second chirp having a second phase, and further wherein a difference between the first phase and the second phase is based upon a first phase rate of change assigned to the first transmitting antenna; and
transmitting, by a second transmitting antenna in the multiple transmitting antennas, a second transmit signal that includes a second sequence of chirps, wherein the second sequence of chirps includes a third chirp having a third phase immediately followed by a fourth chirp having a fourth phase, and further wherein a difference between the third phase and the fourth phase is based upon a second phase rate of change assigned to the second transmitting antenna, the first phase rate of change being different from the second phase rate of change.

11. The method of claim 10, wherein the first transmitting antenna is horizontally displaced from the second transmitting antenna.

12. The method of claim 10, wherein the first transmitting antenna is vertically displaced from the second transmitting antenna.

13. The method of claim 9, wherein the multiple transmitting antennas are included in a two-dimensional array of transmit antennas.

14. The method of claim 9, wherein the multiple transmitting antennas include between two and fifty antennas that are uniformly spaced with respect to one another.

15. The method of claim 9, wherein the multiple transmitting antennas include between two and fifty antennas that are non-uniformly spaced with respect to one another.

16. The method of claim 9, further comprising:
detecting, by a receiving antenna, an echo signal, the echo signal based upon at least one transmit signal emitted by at least one transmitting antenna; and
computing a velocity of an object relative to the FMCW radar system based upon the echo signal.

17. The method of claim 16, further comprising:
controlling at least one of a propulsion system, a braking system, or a steering system of an autonomous vehicle (AV) based upon the computed velocity of the object relative to the FMCW radar system.

18. An autonomous vehicle (AV) comprising:
a fast ramp frequency modulated continuous wave (FMCW) radar system, the fast ramp FMCW radar system configured to perform acts comprising:
generating, by a signal generator of the fast ramp FMCW radar system, a signal; and
based upon the signal, transmitting, by multiple transmitting antennas of the fast ramp FMCW radar system, transmit signals that include respective sequences of chirps, wherein the transmit signals are assigned differing phase rates of change that respectively correspond to velocity offsets in a velocity spectrum of a receiver of the fast ramp FMCW radar system, wherein the velocity offsets are non-uniformly distributed across the velocity spectrum of the receiver of the fast ramp FMCW radar system, and further wherein a whole number results when a multiple of 360 is divided by each of the phase rates of change.

19. The AV of claim 18, further comprising a computing system that is in communication with the fast ramp FMCW radar system, wherein the fast ramp FMCW radar system is configured to compute a velocity of an object relative to the fast ramp FMCW radar system based upon at least one transmit signal in the transmit signals, and further wherein the computing system is configured to control at least one of a propulsion system, a braking system, or a steering system of the AV based upon the computed velocity of the object relative to the fast ramp FMCW radar system.

20. The AV of claim 18, wherein there are between two and fifty transmitting antennas in the multiple transmitting antennas.

* * * * *